(12) United States Patent
Sadasivam et al.

(10) Patent No.: US 11,080,844 B2
(45) Date of Patent: Aug. 3, 2021

(54) SYSTEM AND METHOD FOR TESTING AN ELECTRONIC DEVICE

(71) Applicant: HCL Technologies Limited, Noida (IN)

(72) Inventors: Sivasakthivel Sadasivam, Chennai (IN); Selvaraj Thangaraj, Chennai (IN); Sankareswari Amudhasidhanandham, Chennai (IN); Banumathi Palanichamy, Chennai (IN); Ameli Merlin Soundararajan, Chennai (IN)

(73) Assignee: HCL TECHNOLOGIES LIMITED, Noida (IN)

( * ) Notice: Subject to any disclaimer, the term of this patent is extended or adjusted under 35 U.S.C. 154(b) by 284 days.

(21) Appl. No.: 15/907,185

(22) Filed: Feb. 27, 2018

(65) Prior Publication Data

US 2018/0286030 A1 Oct. 4, 2018

(30) Foreign Application Priority Data

Mar. 31, 2017 (IN) .............................. 201711011825

(51) Int. Cl.
*G06T 7/00* (2017.01)
*H04N 5/232* (2006.01)

(52) U.S. Cl.
CPC ................ *G06T 7/001* (2013.01); *G06T 7/97* (2017.01); *H04N 5/23222* (2013.01); *G06T 2207/10016* (2013.01); *G06T 2207/30108* (2013.01); *G06T 2207/30121* (2013.01)

(58) Field of Classification Search
None
See application file for complete search history.

(56) References Cited

U.S. PATENT DOCUMENTS

| 8,643,714 B2 | 2/2014 | Xiong et al. |
| 2006/0170775 A1 | 8/2006 | Kim |
| 2010/0066850 A1* | 3/2010 | Wilson .................... H04N 17/04 348/222.1 |

(Continued)

FOREIGN PATENT DOCUMENTS

| EP | 2355534 | 8/2011 |
| JP | 3863079 | 2/2004 |
| JP | 4748982 | 7/2006 |

*Primary Examiner* — James M Anderson, II
(74) *Attorney, Agent, or Firm* — HM Law Group LLP; Vani Moodley, Esq.

(57) ABSTRACT

The present disclosure relates to system(s) and method(s) for testing an electronic device. The system may receive a configuration file from a user device. Further, the system may operate the electronic device under test based on a target test case selected from the configuration. The system may further operate a video capturing device to capture a sequence of video frames of visual indicators corresponding to the electronic device under test. The system may further analyse the sequence of video frames to identify one or more target video frames indicating visual change in the visual indicators corresponding to the electronic device. The may further analyse the one or more target video frames to determine response time corresponding to each target video frame. Furthermore, the system may generate a test report based on the response time corresponding to the one or more target video frames.

13 Claims, 3 Drawing Sheets

(56) References Cited

U.S. PATENT DOCUMENTS

| | | | | |
|---|---|---|---|---|
| 2012/0287289 A1* | 11/2012 | Steinberg | ............. | H04N 17/004 348/181 |
| 2013/0016207 A1* | 1/2013 | Xiong | .................... | G09G 3/006 348/92 |
| 2017/0344449 A1* | 11/2017 | Tung | ..................... | G06F 11/263 |

* cited by examiner

SYSTEM AND METHOD FOR TESTING AN ELECTRONIC DEVICE

CROSS-REFERENCE TO RELATED APPLICATIONS AND PRIORITY

The present application benefit from Indian Complete Patent Application No 201711011825 filed on 31 Mar. 2017, the entirety of which is hereby incorporated by reference.

TECHNICAL FIELD

The present disclosure in general relates to the field of testing. More particularly, the present invention relates to a system and method for testing of an electronic device with visual indicators.

BACKGROUND

Electronic devices these days are supported by visual indicators and display screens in order to enable a user to interact with the electronic device in an efficient manner. However, when it comes to testing of these visual indicators, conventional techniques of manual testing are used. The manual testing techniques are error prone due to human error. To address this problem, organization are now looking towards automated testing techniques.

Test automation uses a special software (separate from the software being tested) to control the execution of tests and the comparison of actual outcomes with predicted outcomes. Test automation can perform additional testing that would be difficult to do manually. Test automation is critical for continuous delivery and continuous testing. It requires an automation tool/component to execute the test case suite and it demands considerable investments of money and resources. Successive development cycles require execution of same test suite repeatedly. Using a test automation tools it is possible to record this test suite and re-play it as required. However, in order to implement automated testing process for visual indicators, the following challenges are faces:

- Display change detection/LED blinking duration at the rate of milliseconds.
- Testing of final product is tedious for the parameter testing.
- Some automation testing requires manual intervention.

Moreover, automation testing for embedded device/display oriented device is complex. For most of the test cases/test suites, changes in software interfaces and hardware configurations are critical and which makes testing more challenging. These types of automated testing require specialized programming skills that often require additional training.

SUMMARY

This summary is provided to introduce aspects related to a system and method for testing of an electronic device and the aspects are further described below in the detailed description. This summary is not intended to identify essential features of the claimed subject matter nor is it intended for use in determining or limiting the scope of the claimed subject matter.

In one embodiment, a method for testing an electronic device is illustrated. The method may comprise receiving, by a processor, a configuration file from a user device. The configuration file may comprise a set of test cases and a set of instructions corresponding to each test case from the set of test cases. The set of instructions may be configured to operate a video capturing device. The video capturing device may be configured to capture a sequence of video frames of visual indicators corresponding to the electronic device under test. The method may further comprise operating, by the processor, the electronic device under test based on a target test case selected from the set of test cases. The method may further comprise operating, by the processor, the video capturing device, based on a target set of instructions corresponding to the target test case, to capture a sequence of video frames of the visual indicators corresponding to the electronic device under test. The method may further comprise analysing, by the processor, the sequence of video frames to identify one or more target video frames indicating visual change in the visual indicators corresponding to the electronic device. The method may further comprise computing, by the processor, a response time corresponding to each target video frame from the one or more target video frames, wherein the response time for each target video frame is computed based on a number of video frames between the first video frame, of the sequence of video frames, and the target video frame. The method may further comprise generating, by the processor, a test report corresponding to the target test case based on the comparison of the response time corresponding to the one or more target video frames with one or more predefined threshold values.

In another embodiment, a system for testing an electronic device is illustrated. The system comprises a video capturing device, configured to capture a sequence of video frames of a visual indicators corresponding to the electronic device under test and a central processing unit. The central processing unit may be communicatively coupled to the video capturing device and the electronic device under test. The central processing unit may comprise a memory and a processor coupled to the memory, further the processor may be configured to execute programmed instructions stored in the memory. In one embodiment, the processor may execute programmed instructions stored in the memory for receiving a configuration file from a user device. The configuration file may comprise a set of test cases and a set of instructions corresponding to each test case from the set of test cases. The set of instructions may be configured to operate the video capturing device. The processor may further execute programmed instructions stored in the memory for operating the electronic device under test based on a target test case selected from the set of test cases. The processor may further execute programmed instructions stored in the memory for operating the video capturing device, based on a target set of instructions corresponding to the target test case, to capture a sequence of video frames of the visual indicators corresponding to the electronic device under test. The processor may further execute programmed instructions stored in the memory for analysing the sequence of video frames to identify one or more target video frames indicating visual change in the visual indicators corresponding to the electronic device. The processor may further execute programmed instructions stored in the memory for computing a response time corresponding to each target video frame from the one or more target video frames, wherein the response time for each target video frame is computed based on a number of video frames between the first video frame, of the sequence of video frames, and the target video frame. The processor may further execute programmed instructions stored in the memory for generating a test report corresponding to the target test case based on the comparison of the response time corresponding to the one or more target video frames with one or more predefined threshold values.

In yet another embodiment, a computer program product having embodied computer program for testing an electronic device is disclosed. The program may comprise a program code for receiving a configuration file from a user device. The configuration file may comprise a set of test cases and a set of instructions corresponding to each test case from the set of test cases. The set of instructions may be configured to operate a video capturing device. The video capturing device may be configured to capture a sequence of video frames of visual indicators corresponding to the electronic device under test. The program may comprise a program code for operating the electronic device under test based on a target test case selected from the set of test cases. The program may comprise a program code for operating the video capturing device, based on a target set of instructions corresponding to the target test case, to capture a sequence of video frames of the visual indicators corresponding to the electronic device under test. The program may comprise a program code for analysing the sequence of video frames to identify one or more target video frames indicating visual change in the visual indicators corresponding to the electronic device. The program may comprise a program code for computing a response time corresponding to each target video frame from the one or more target video frames, wherein the response time for each target video frame is computed based on a number of video frames between the first video frame, of the sequence of video frames, and the target video frame. The program may comprise a program code for generating a test report corresponding to the target test case based on the comparison of the response time corresponding to the one or more target video frames with one or more predefined threshold values.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
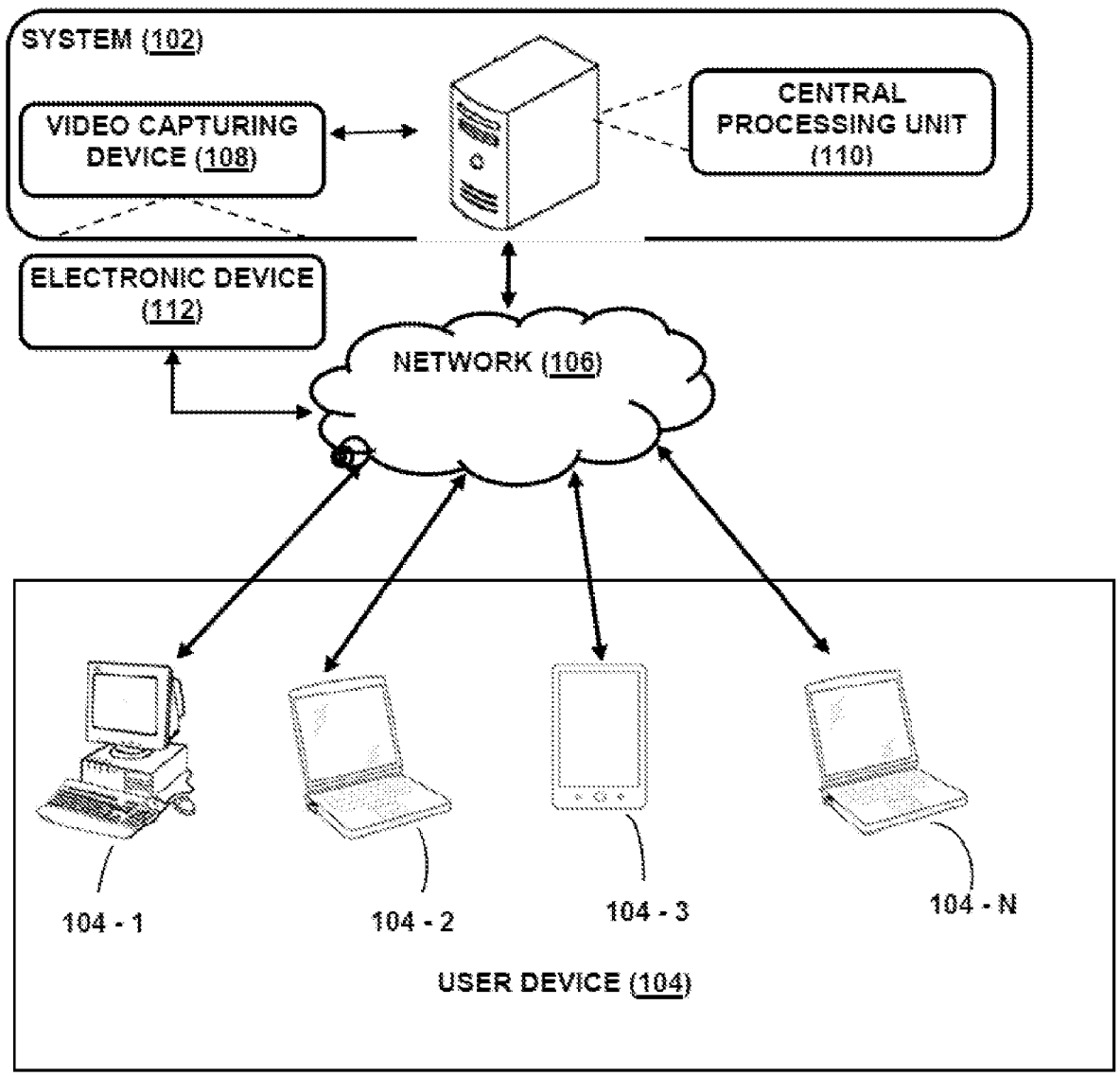
FIG. 1 illustrates a network implementation of a system for testing of an electronic device, in accordance with an embodiment of the present subject matter.

Some embodiments of the present disclosure, illustrating all its features, will now be discussed in detail. The words "receiving", "operating", "analysing", and "computing", "generating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Various modifications to the embodiment will be readily apparent to those skilled in the art and the generic principles herein may be applied to other embodiments. However, one of ordinary skill in the art will readily recognize that the present disclosure for testing of the electronic device is not intended to be limited to the embodiments illustrated but is to be accorded the widest scope consistent with the principles and features described herein.

The present subject matter relates to a system and method for testing an electronic device. The system is communicatively coupled with the electronic device under test (DUT) and a video capturing device. The electronic device under test (DUT) may be an embedded device, display device, handheld device, or any other electronic device with visual indicators. The electronic device under test (DUT) may be configurable based on the testing requirements such as the test case/hardware/User inputs. The configurable items may include:

Device specific details
Reference patterns/Images
Location of the given frame
Text/lights blinking duration
Order of the patterns/Images
Frames per second Furthermore, the video capturing device (Video Recorder/Renderer) of the system is configured to record the DUT (Device under test) actions. Furthermore, for testing electronic device based on the recorded videos (sequence of video frames), the system may initially store the sequence of video frames in a database. Furthermore, the reference patterns/location in the sequence of video frames are analysed for testing text/lights blinking duration and the like. In one embodiment, the location can be configured dynamically for tracking the object position change in frames. Furthermore, the reference home screens of the DUT is configured to be used for analysing the boot up time duration. Order of the DUT screens are configured to verify the screen change speed and also to verify the order of change of the video frames. In one embodiment, the system may be configured to perform a boot up time testing, text/message/light blink testing, screen/frame change speed testing, frame sequence testing, and a like.

For the purpose of boot up time testing the system may be configured to:
  Capture a sequence of video frames of the DUT
  Compare the sequence of video frames the home screen image
  Determine the video frame which matches home screen image
  Compute the boot up time based on the position of the video frame in the sequence of video frame.

For the purpose of Text/Message/Lights Blink testing the system may be configured to:
  Capture a sequence of video frames of the DUT
  Text/Message/lights are retrieved from configurable item
  Compare the frames with the configured patterns and validate the ON-time of the pattern and the OFF-time of the pattern and provide the duration between the frames
  Track the text/message/Object and provide the corresponding coordinate of the text message For the purpose of screen/frame change speed testing the system may be configured to:
  Capture a sequence of video frames of the DUT
  Compare the sequence of video frames with the reference screens, once the reference screen matches with the frame then the system is configured to compare the next frames with the Sequence change identification Capture the sequence of changes with relevant frame number/frame/text and analyse the changes with configurable items for screen/frame change speed testing For the purpose of Performance Calculation from Regression testing the system may be configured to:

Capture a sequence of video frames of the DUT

Retrieve sequence of changes from configurable items, then calculating the time difference between these two changes.

Determine the time duration between the changes for each and every test cases

Determine the overall duration/average duration/performance of the two changes on each test case.

Calculate the performance result of the particular change and overall performance test result of the entire sequence Based on the number of test cases, a report may be generated by the system. The report may be configured in any file format specified by the user. The report can be uploaded on a cloud platform. Once report is updated the next cycle of testing may be started.

Referring now to FIG. 1, a network implementation 100 of a system 102 for testing an electronic device 112 is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106. Further, the system 102 may comprise a central processing unit 110 and a video capturing device 108. The central processing unit 110 may be communicatively coupled with the video capturing device 108 and an electronic device 112.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one implementation, the video capturing device 108 may be a separate device such as a video camera, a webcam or any other image capturing device coupled to the system 102. In another implementation, the system 102 may comprise the video capturing device 108 configured to capture a sequence of video frames of the visual indicators corresponding to the electronic device 112 under test and the central processing unit 110. The central processing unit 110 may be communicatively coupled to the video capturing device 108 and the electronic device 112 under test. The central processing unit 110 may comprise a memory and a processor coupled to the memory. The processor may be configured to execute programmed instructions stored in the memory. In one embodiment, the processor may execute programmed instructions stored in the memory for receiving a configuration file from a user device 104. The configuration file may comprise a set of test cases and a set of instructions corresponding to each test case from the set of test cases. The set of instructions may be configured to operate the video capturing device.

Furthermore, the processor may further execute programmed instructions stored in the memory for operating the electronic device 112 under test based on a target test case selected from the set of test cases. The processor may further execute programmed instructions stored in the memory for operating the video capturing device 108 based on a target set of instructions corresponding to the target test case, to capture a sequence of video frames of the electronic device 112 under test. The processor may further execute programmed instructions stored in the memory for analysing the sequence of video frames to identify one or more target video frames indicating visual change in the visual indicators corresponding to the electronic device 112.

The processor may further execute programmed instructions stored in the memory for computing a response time corresponding to each target video frame from the one or more target video frames. In one embodiment, the response time for each target video frame is computed based on a number of video frames between the first video frame, of the sequence of video frames, and the target video frame. The processor may further execute programmed instructions stored in the memory for generating a test report corresponding to the target test case based on the comparison of the response time corresponding to the one or more target video frames with one or more predefined threshold values. The system 102 for testing the electronic device 112 is further elaborated with respect to the FIG. 2.

Figure 2:
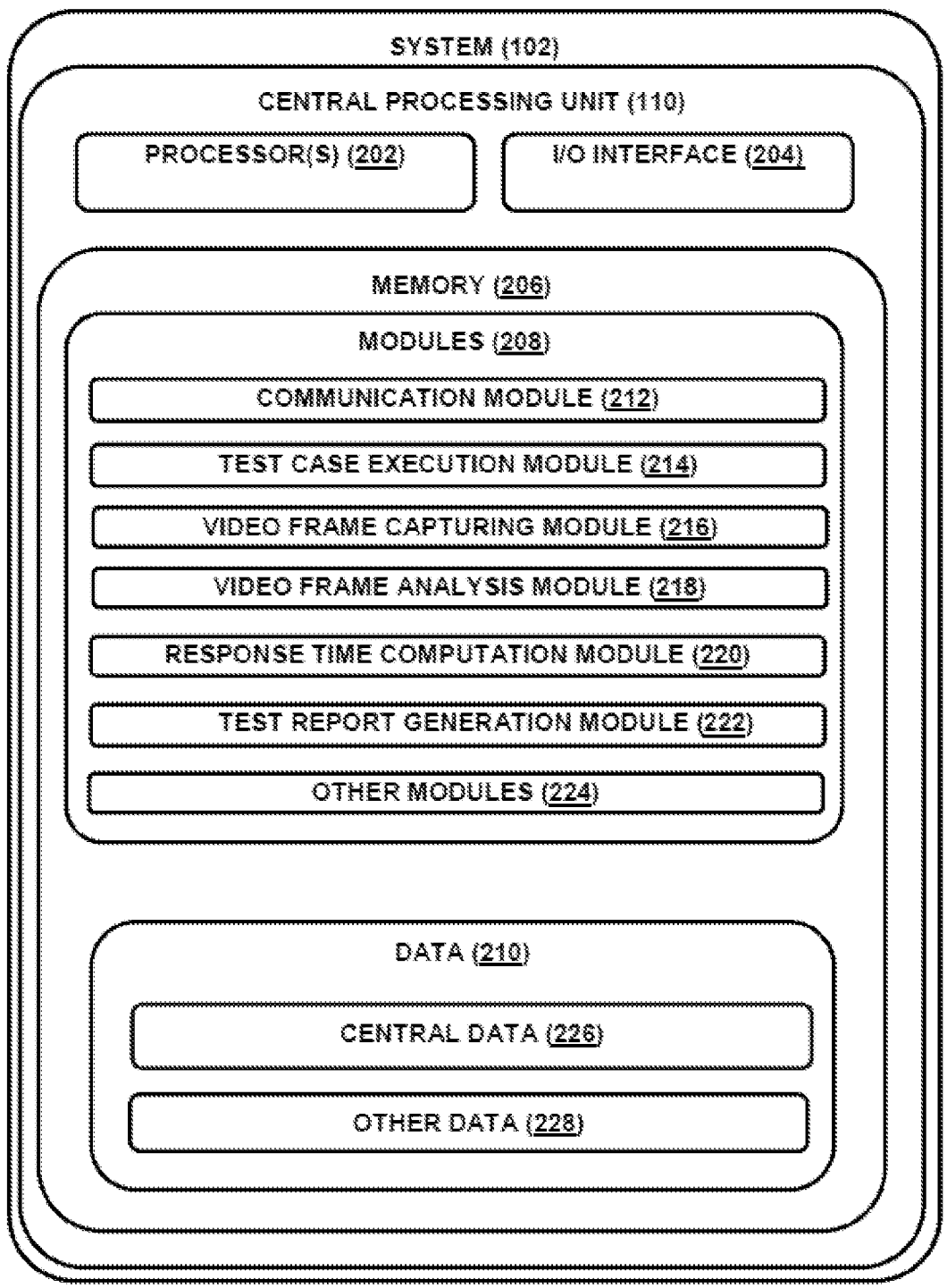
FIG. 2 illustrates the system for testing of the electronic device, in accordance with an embodiment of the present subject matter.

Referring now to FIG. 2, the system 102 for testing the electronic device 112 is illustrated in accordance with an embodiment of the present subject matter. In one embodiment, the system 102 may comprise the video capturing device 108 and the central processing unit 110. The central processing unit 110 include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a communication module 212, a test case execution module 214, a video frame capturing module 216, a video frame analysis module 218, a response time computation module 220, a test report generation module 222 and other modules 224. The other modules 224 may include programs or coded instructions that supplement applications and functions of the system 102.

The data 210, amongst other things, serve as a repository for storing data processed, received, and generated by one or more of the modules 208. The data 210 may also include a central data 226, and other data 228. In one embodiment, the other data 228 may include data generated as a result of the execution of one or more modules in the other module 224.

In one implementation, a user may access the central processing unit 110 of the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the communication module 212 may be configured to receive a configuration file from a user device 104. The configuration file may comprise a set of test cases and a set of instructions corresponding to each test case from the set of test cases. The set of test cases may be configured for boot up time testing, device performance testing, blinking duration testing, frame speed testing, object tracking, and frame sequence testing. Furthermore, the set of instructions may be configured to operate the video capturing device 108. The video capturing device 108 may be configured to capture a sequence of video frames of visual indicators corresponding to the electronic device 112 under testing. The electronic device 112 under test may be one of an LCD display, an LED display, a mobile communication device, or an electronic device with visual indicators.

In one embodiment, the user of the user device 104 may communicate with the central processing unit 110 and transmit instructions to perform a target test on the electronic device 112. Upon receiving the instruction from the user device 104, the test case execution module 214 may identify target test case, from the set of test cases, based on the instruction received from the user device 104. Furthermore, the test case execution module 214 is configured to operate the electronic device 112 under test based on the target test case. For example, if the target test case selected by the user corresponds to boot up time testing, the test case execution module 214 is configured to operate the electronic device 112 to perform boot up operation. For performing the boot up operation the test case execution module 214 may be configured to operate an automated mechanism/external robotic device such as a robotic arm to power on the electronic device 112. In another example if the target test case selected by the user corresponds to device performance testing, the test case execution module 214 is configured to operate the electronic device 112 to perform a predetermine display operation. For performing the performance testing operation the test case execution module 214 may be configured to operate an automated software configuration for operating the electronic device 112 to perform the predefined display operation such as displaying a movie clip or display a sequence of frames with different colours. The automated software configuration may be in the form of a software module configured to trigger ADB commands for operating the electronic device 112.

In one embodiment, as soon as the instructions are transmitted to the electronic device 112, the video frame capturing module 216 is configured to operate the video capturing device 108 based on a target set of instructions corresponding to the target test case. The target set of instructions may be configured to operate the video capturing device to capture a sequence of video frames of the visual indicators corresponding to the electronic device 112 under test. In one embodiment, the test case execution module 214 and the video frame capturing module 216 may operate in collaboration in order to operate the electronic device 112 and capture the sequence of video frames in a time bound manner.

Furthermore, once the sequence of video frames is captured, in the next step, the sequence of video frames is analysed by the video frame analysis module 218 in order to identify one or more target video frames indicating visual change in the visual indicators corresponding to the electronic device 112. In one embodiment, the video frame analysis module 218 may enable an image processing algorithm. The image processing algorithm may be configured to detect visual change in the visual indicators corresponding to the electronic device 112. For this purpose, the image processing algorithm may be configured to compare two or more consecutive video frames from the sequence of video frames to detect the one or more target video frames with visual change.

Furthermore, the response time computation module 220 may be configured to compute a response time corresponding to each target video frame from the one or more target video frames. The response time for each target video frame is computed based on a number of video frames between the first video frame, of the sequence of video frames, and the target video frame. In one embodiment, the response time for a target video frame may be computed based on the frame speed of the video capturing device and the number of video frames between the first video frame, of the sequence of video frames, and the target video frame. For example, if the frame speed of the video capturing device is 15 µs and the number of frames between the first video frame and the target video frame is 20, then the response time of the electronic device 112 may be determined as 20*15 µs (i.e. 300 µs). By using the frame speed of the video capturing device for computing the response time, the present system negates the need of maintaining a separate clock for computing the response time.

Furthermore, the test report generation module 222 generate a test report corresponding to the target test case based on the comparison of the response time corresponding to the one or more target video frames with one or more predefined threshold values. In one embodiment, the one or more predefined threshold values are determined based on the configuration of the electronic device 112 under test. Further, the method for testing the electronic device is further elaborated with respect to the block diagram of FIG. 3.

Figure 3:
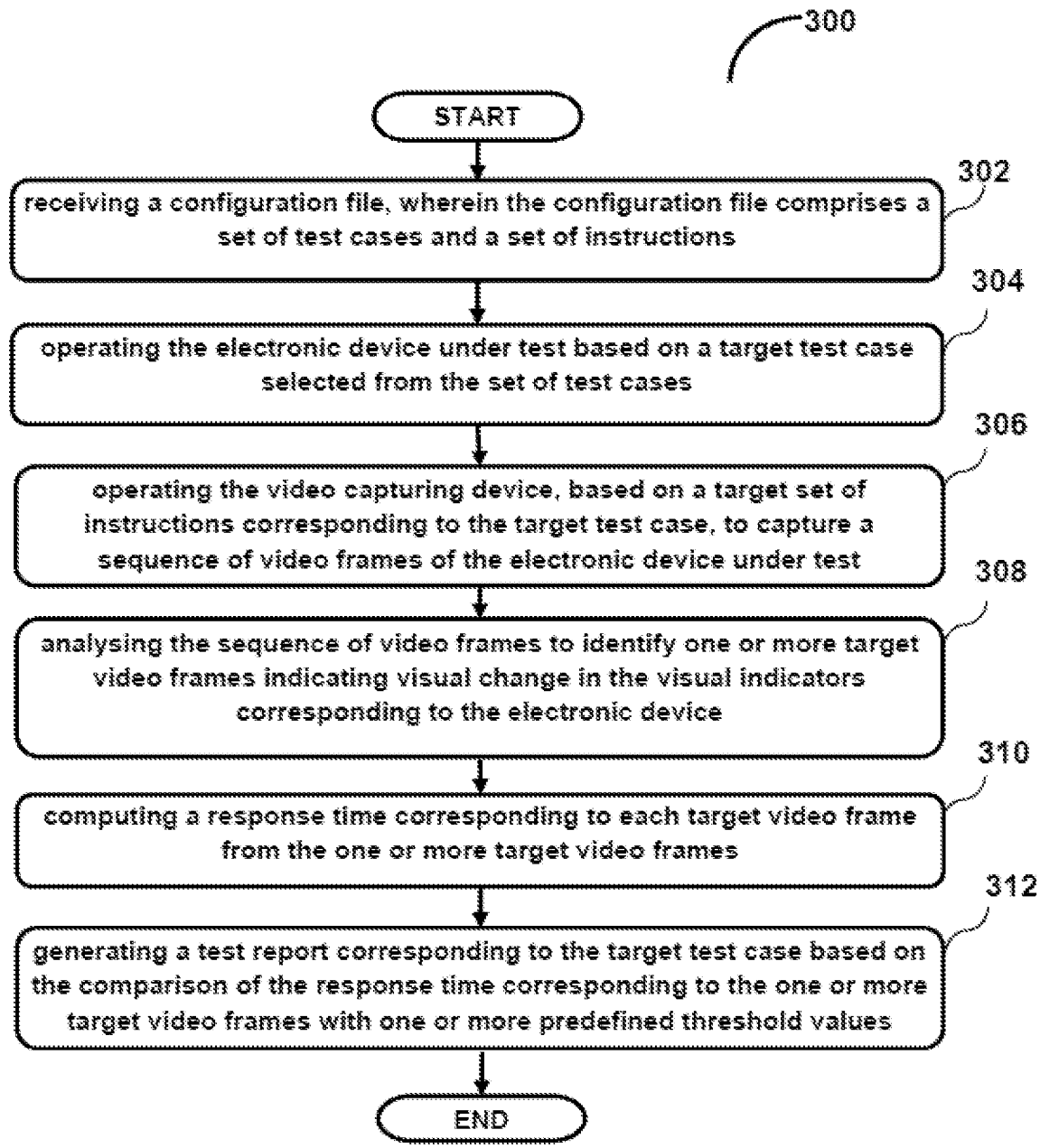
FIG. 3 illustrates a method for testing of the electronic device, in accordance with an embodiment of the present subject matter.

Referring now to FIG. 3, a method 300 for testing the electronic device 112, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the communication module 212 may be configured to receive a configuration file from a user device 104. The configuration file may comprise a set of test cases and a set of instructions corresponding to each test case from the set of test cases. The set of test cases may be configured for boot up time testing, device performance testing, blinking duration testing, frame speed testing, object tracking, and frame sequence testing. Furthermore, the set of instructions may be configured to operate the video capturing device 108. The video capturing device 108 may be configured to capture a sequence of video frames of visual indicators corresponding to the electronic device 112 under testing. The electronic device 112 under test may be one of an LCD display, an LED display, a mobile communication device, or an electronic device with visual indicators.

At block 304, the user of the user device 104 may communicate with the central processing unit 110 and transmit instructions to perform a target test on the electronic device 112. Upon receiving the instruction from the user device 104, the test case execution module 214 may identify target test case, from the set of test cases, based on the instruction received from the user device 104. Furthermore, the test case execution module 214 is configured to operate the electronic device 112 under test based on the target test case. For example, if the target test case selected by the user corresponds to boot up time testing, the test case execution module 214 is configured to operate the electronic device 112 to perform boot up operation. For performing the boot up operation the test case execution module 214 may be configured to operate an automated mechanism/external robotic device such as a robotic arm to power on the electronic device 112. In another example if the target test case selected by the user corresponds to device performance testing, the test case execution module 214 is configured to operate the electronic device 112 to perform a predetermine display operation. For performing the performance testing operation the test case execution module 214 may be configured to operate an automated software configuration for operating the electronic device 112 to perform the predefined display operation such as displaying a movie clip or display a sequence of frames with different colours. The automated software configuration may be in the form of a software module configured to trigger ADB commands for operating the electronic device 112.

At block 306, as soon as the instructions are transmitted to the electronic device 112, the video frame capturing module 216 is configured to operate the video capturing device 108 based on a target set of instructions corresponding to the target test case. The target set of instructions may be configured to operate the video capturing device to capture a sequence of video frames of the visual indicators corresponding to the electronic device 112 under test. In one embodiment, the test case execution module 214 and the video frame capturing module 216 may operate in collaboration in order to operate the electronic device 112 and capture the sequence of video frames in a time bound manner.

At block 308, once the sequence of video frames is captured, in the next step, the sequence of video frames is analysed by the video frame analysis module 218 in order to identify one or more target video frames indicating visual change in the visual indicators corresponding to the electronic device 112. In one embodiment, the video frame analysis module 218 may enable an image processing algorithm. The image processing algorithm may be configured to detect visual change in the visual indicators corresponding to the electronic device 112. For this purpose, the image processing algorithm may be configured to compare two or more consecutive video frames from the sequence of video frames to detect the one or more target video frames with visual change.

At block 310, the response time computation module 220 may be configured to compute a response time corresponding to each target video frame from the one or more target video frames. The response time for each target video frame is computed based on a number of video frames between the first video frame, of the sequence of video frames, and the target video frame. In one embodiment, the response time for a target video frame may be computed based on the frame speed of the video capturing device and the number of video frames between the first video frame, of the sequence of video frames, and the target video frame. For example, if the frame speed of the video capturing device is 15 µs and the number of frames between the first video frame and the target video frame is 20, then the response time of the electronic device 112 may be determined as 20*15 µs (i.e. 300 µs). By using the frame speed of the video capturing device for computing the response time, the present system negates the need of maintaining a separate clock for computing the response time.

At block 312, the test report generation module 222 generate a test report corresponding to the target test case based on the comparison of the response time corresponding to the one or more target video frames with one or more predefined threshold values. In one embodiment, the one or more predefined threshold values are determined based on the configuration of the electronic device 112 under test.

Although implementations for systems and methods for testing an electronic device have been described, it is to be understood that the appended claims are not necessarily limited to the specific features or methods described. Rather, the specific features and methods are disclosed as examples of implementations for testing the electronic device.

We claim:

1. A system for testing of an electronic device, the system comprising:

a video capturing device, capturing a sequence of video frames of visual indicators corresponding to an electronic device under test;

a user device communicate with a central processing unit and transmit instructions to perform a target test on the electronic device, wherein upon receiving the instruction from the user device the test case execution module identify target test case;

the central processing unit communicatively coupled to the video capturing device and the electronic device under test, wherein the central processing unit comprising a memory and a processor coupled to the memory, wherein the processor executes programmed instructions stored in the memory for:

receiving a configuration file, wherein the configuration file comprises a set of test cases and a set of instructions corresponding to each test case from the set of test cases, wherein the set of instructions used to operate the video capturing device;

operating the electronic device under test based on a target test case selected from the set of test cases;

operating the video capturing device, based on a target set of instructions corresponding to the target test case, to capture a sequence of video frames of the visual indicators corresponding to the electronic device under test;

analysing the sequence of video frames to identify one or more target video frames indicating visual change in the visual indicators corresponding to the electronic device;

computing a response time corresponding to each target video frame from the one or more target video frames, wherein the response time for each target video frame is computed based on a frame speed of the video capturing device and a number of video frames between the first video frame of the sequence of video frames and the target video frame; and generating a test report corresponding to the target test case based on the comparison of the response time corresponding to the one or more target video frames with one or more predefined threshold values.

2. The system of claim 1, wherein the electronic device under test is selected from a group of LCD display, LED display, a mobile communication device, or an electronic device with visual indicators.

3. The system of claim 1, wherein the target test case from the set of test cases tests the electronic device under test for at least one of a Boot up time testing, a device performance testing, a blinking duration testing, a frame speed testing and frame sequence testing.

4. The system of claim 1, wherein the visual change in the visual indicators corresponding to the electronic device is detected using an image processing algorithm, wherein the image processing algorithm is compares two or more consecutive video frames from the sequence of video frames to detect the one or more target video frames with visual change.

5. The system of claim 1, wherein the one or more predefined threshold values are determined based on the configuration of the electronic device under test.

6. A method for testing of an electronic device, the method comprising:

receiving, by a processor, a configuration file, wherein the configuration file comprises a set of test cases and a set of instructions corresponding to each test case from the set of test cases, wherein the set of instructions operates a video capturing device, and wherein the video capturing device captures a sequence of video frames of visual indicators corresponding to the electronic device under test;

operating, by the processor, the electronic device under test based on a target test case selected from the set of test cases;

operating, by the processor, the video capturing device, based on a target set of instructions corresponding to the target test case, to capture a sequence of video frames of the visual indicators corresponding to the electronic device under test;

analysing, by the processor, the sequence of video frames to identify one or more target video frames indicating visual change in the visual indicators corresponding to the electronic device;

computing, by the processor, a response time corresponding to each target video frame from the one or more target video frames, wherein the response time for each target video frame is computed based on a frame speed of the video capturing device and a number of video frames between the first video frame, of the sequence of video frames, and the target video frame; and generating, by the processor, a test report corresponding to the target test case based on the comparison of the response time corresponding to the one or more target video frames with one or more predefined threshold values.

7. The method of claim 6, wherein the electronic device under test is selected from a group of LCD display, LED display, a mobile communication device, or an electronic device with visual indicators.

8. The method of claim 6, wherein the target test case from the set of test cases tests the electronic device under test for at least one of a Boot up time testing, a device performance testing, a blinking duration testing, a frame speed testing, an object tracking, and frame sequence testing.

9. The method of claim 6, wherein the visual change in the visual indicators corresponding to the electronic device is detected using an image processing algorithm, wherein the image processing algorithm compares two or more consecutive video frames from the sequence of video frames to detect the one or more target video frames with visual change.

10. The method of claim 6, wherein the one or more predefined threshold values are determined based on the configuration of the electronic device under test.

11. A non-transitory computer program product having embodied thereon a computer program for testing of an electronic device, the computer program product comprising:

a program code for receiving a configuration file, wherein the configuration file comprises a set of test cases and a set of instructions corresponding to each test case from the set of test cases, wherein configuration file received from a user device, wherein the set of instructions operate a video capturing device, and wherein the video capturing device captures a sequence of video frames of visual indicators corresponding to an electronic device under test;

a program code for operating the electronic device under test based on a target test case selected from the set of test cases, wherein test case execution module identify target test case, based on the instruction received from the user device;

a program code for operating the video capturing device, based on a target set of instructions corresponding to the target test case, to capture a sequence of video frames of the visual indicators corresponding to the electronic device under test;

a program code for analysing the sequence of video frames to identify one or more target video frames indicating visual change in the visual indicators corresponding to the electronic device;

a program code for computing a response time corresponding to each target video frame from the one or more target video frames, wherein the response time for each target video frame is computed based on a frame speed of the video capturing device and a number of video frames between the first video frame, of the sequence of video frames, and the target video frame; and a program code for generating a test report corresponding to the target test case based on the comparison of the response time corresponding to the one or more target video frames with one or more predefined threshold values.

12. The system of claim 1, wherein the target test case from the set of test cases tests the electronic device under test for blinking duration testing.

13. The method of claim 6, wherein the target test case from the set of test cases tests the electronic device under test for blinking duration testing.

* * * * *